United States Patent Office 3,056,821
Patented Oct. 2, 1962

3,056,821
SUBSTITUTED AMMONIUM SALTS OF ARSONIC ACIDS AND SELECTIVE WEED CONTROL
Arthur Schwerdle, Vineland, N.J., assignor to Vineland Chemical Company, Vineland, N.J., a firm
No Drawing. Filed Apr. 3, 1958, Ser. No. 726,066
32 Claims. (Cl. 260—442)

This invention relates to weed control, and more particularly provides novel and improved compositions and methods for the control of weeds, especially annual grassy weeds, without injury to desirable accompanying grasses and other vegetation such as crops and ground cover like clover and dichondra.

Indiscriminate suppression and kill of vegetation are relatively easy to produce by chemical methods. However, what is generally desired is the production of selective weed control, whereby the desired and cultivated vegetation is left unmolested while accompanying unwanted vegetative growth is eradicated, with the precise preferential action of the hand-guided hoe.

The selective control of grassy weeds is of particular concern, especially in turf grass culture. The turf grass which is cultivated in lawns, golf-greens and farms consists of perennial grasses, which provide a solid permanent ground cover. Annual grasses, on the other hand, die after growth during a portion of a year. When an annual grassy weed such as crabgrass invades turf, the annual growth proliferates strongly during its growing season, and crowds out the more desirable grasses. When the annual grass subsequently dies, bare unsightly areas are left. To avoid this, selective weed control is required.

A number of agents have been proposed in the past for the selective control of annual grassy weeds such as crabgrass in turf grass culture. The disadvantageous limitations of materials such as arsenates, arylacetic and aryloxyacetic acids, cyanates and phenylmercury salts include, for example, activity during only a portion of the crabgrass life cycle, production of injury to desirable vegetation such as clover, and insufficient selectivity, with consequent damage to the turf grass. One of the more recently developed classes of crabgrass control agents comprises certain urea derivatives. These urea compounds also show a tendency to be unreliably selective, at times causing injury to desirable foliage, and additionally, are limited in utility because they must be applied as a preemergent treatment.

One of the presently most common methods of selectively controlling crabgrass (such as *Digitaria sanguinalis* and *D. ischaemum*) involves application of disodium methyl arsonate. The success of this method is particularly attributable to the notable selectivity of action of the stated compound, whereby effective suppression of the crabgrass is achieved without injury to desirable vegetation. The disodium methyl arsonate exhibits useful selectivity when employed on turf comprising such species as Kentucky and Merion blue grass, centipede grass, bents, Zoysia and Bermuda grasses, as well as dichondra and clover. The use of disodium methyl arsonate has now to a large extent displaced the other crabgrass control procedures previously in common use.

It is an object of this invention to provide improved methods and compositions for the selective control of grassy weeds.

A particular object of this invention is to provide an improved method for the selective control of grassy weeds in the presence of desirable vegetation, especially desirable grasses, said method being characterized by improved rapidity of action.

Another particular object of this invention is to provide novel compositions characterized by rapid and selective activity for the control of grassy weeds without injury to desirable vegetation including desirable grasses.

These and other objects will become evident from a consideration of the following specification and claims.

The novel compositions provided by this invention are substituted ammonium salts of alkyl arsonic acids of the formula

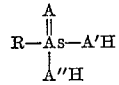

where R is an aliphatic radical selected from the group consisting of methyl, ethyl, propyl, allyl and butyl; and each of A, A' and A" is an atom of an element of group VIA having an atomic weight below 40, i.e., each of A, A' and A" is individually selected from the group consisting of O and S; wherein the substituted ammonium groups of said salts are alkylammonium groups containing from 6 to 14 carbon atoms. It has been found, in accordance with the method of this invention, that by the application of the stated alkylammonium salts of the said alkyl arsonic acids to an area containing undesirable vegetative growth, there is provided control of undesirable vegetation which is substantially more advantageous than is afforded by previously known salts of the said alkyl arsonic acids, including disodium methyl arsonate. While exhibiting a parallel discriminatory selectivity in the control of grassy weeds without injury to associated desirable vegetation including grasses, the new salts provided hereby take effect on the undesired weeds very much faster, especially in northerly latitudes, and are substantially more potent, producing the same kill when applied at about half the rate of the earlier salts.

In my Patent No. 2,678,265 relating to the use of alkyl arsonic acids for selective crabgrass control, I disclosed the use of these acids in the form of salts, either with metals, as represented by the disodium methyl arsonate salt mentioned above, or with organic compounds, as illustrative of which I mentioned substituted ammonium salts of these acids comprising salts with ethanolamine and with morpholine.

My recent research with substituted ammonium salts of these arsenicals has now resulted in the surprising discovery that the configuration of the substituted ammonium moiety has a distinct effect on the properties of the resulting salts, and that when such substituted ammonium group is an alkyl ammonium group containing from 6 to 14, and preferably from 8 to 12 carbon atoms, the salt has unusual merit, producing pronouncedly more rapid selective kill of the grassy weeds than other salts, and being effective without injury to the desired grasses and other desirable plant growth.

When the substituted ammonium salt with the alkyl arsonic acid is derived from an amine which contains less than 6 carbon atoms, the salt is substantially no more efficacious than the ordinary metallic alkyl arsonate salts. Thus for example, the ethanolamine and butylamine salts show no advantage over water-soluble metallic salts such as disodium methyl arsonate. On the other hand, effectiveness of the amine salt is also reduced when an alkylamine containing above 12 carbon atoms is employed; and salts of the alkyl arsonic acids with alkyl amines which contain about 14 carbon atoms, up to about 18 carbon atoms, while exhibiting selective weed control activity, are much less effective than the preferred compounds of this invention.

The effectiveness of the amine salts of the alkyl arsonic acids is also reduced when amines other than alkyl amines are employed. Cyclic and aromatic amine salts such as those of cyclohexyl amine, dicyclohexyl amine, abietyl amine, and aniline are generally no more potent than the alkyl arsonate metallic salts. Alkoxy amines, such as condensates of ethylene oxide with alkyl amines, reduce the selectivity of the arsonates.

Tests comparing the octyl- to dodecyl-ammonium methyl arsonates with other methyl arsonate salts such as the barium, calcium, ammonium, potassium, lead, zinc and magnesium salts quite clearly show that these salt types fall in a category giving results considerably inferior to those produced by the $C_8$–$C_{12}$ alkylammonium salts.

The selective herbicidal efficacy of the presently provided novel amine salts resides in the molecular configuration itself. When simple salts of the preferred class of amines, such as the hydrochlorides thereof, are applied to grasses alone, they do not show the herbicidal qualities exhibited by the amine alkyl arsonate salts. Furthermore, mixtures of metal arsonate salts and simple amine salts are also ineffective to produce the desired results. Thus, for example, mixtures have been prepared using sodium methyl arsonate and amine acetates or hydrochlorides in various ratios. Over a range of pH values, all are inferior to the amine arsonate salt. To explore the possibility that the enhanced effectiveness was due to surface tension reduction, in addition to the above-mentioned tests conducted with mixtures of the arsonate and of the amine salts, experiments were also carried out in which the arsonate was admixed with other wetting agents. Neither nonionic nor anionic wetting agents admixed with disodium methyl arsonate produce compositions having the exceptional activity of the stated amine salts. Indeed, greater wetting is effected when the amine selected to form the arsonate salt is of longer chain length than the preferred class described above, but the salts of such amines are of lower efficacy in controlling weed growth.

As stated above, the novel compositions hereby provided for the practice of the method of this invention are substituted ammonium salts of the arsonic acids of formula indicated above wherein the substituted ammonium group is an alkylammonium group containing from 6 to 14, preferably from 8 to 12 carbon atoms. Such salts will include both mono- and bis-(alkylammonium) salts of the arsonic acids; when a mono-(alkylammonium) salt is employed, the second acid function of the arsonic acid may either remain in acid form, or be converted to a salt with an inorganic cation, preferably a water-solubilizing cation such as an alkaline cation like ammonium, sodium, potassium and the like. Accordingly, the novel compounds of this invention will be represented by the formula

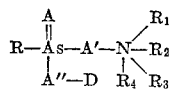

where R is an aliphatic radical selected from the group consisting of methyl, ethyl, propyl, butyl and allyl; each of A, A' and A'' is an element of group VIA individually selected from the group consisting of O and S; D is a cation selected from the group consisting of H, alkaline water-solubilizing cations, and the radical

and

is an alkylammonium radical containing a total of from 6 to 14 carbon atoms in which $R_1$ is an alkyl radical and each of $R_2$, $R_3$ and $R_4$ is selected from the group consisting of H and alkyl radicals.

To prepare the presently provided alkylammonium salts, the appropriate arsonic acid compound is simply contacted with the desired amine or quaternary ammonium compound in a solvent. In many cases, a suitable arsonic acid compound other than the free acid as such, such as a salt or anhydride, will be used as the reactant especially where the free acid as such is unstable. Likewise an amine salt may be used in lieu of a free amine. However, for the sake of convenience in describing the reactants herein reference may be made to arsonic acids and amines.

The weed control properties of disodium trithio methyl arsonate

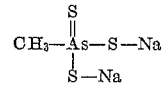

are about the same as those of disodium methyl arsonate

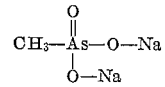

and for reasons of economy and availability, the oxy arsonic acid metallic salts are generally preferred. However, in the form of the substituted ammonium salts, the promising herbicidal properties exhibited by the thioarsonic acids may well justify the selection of the thio acid in preference to the oxy acid. Accordingly, the substituted ammonium salts contemplated by this invention include salts of both arsonic and thioarsonic acids. The arsonic acids from which the amine salts are prepared will be selected from methyl arsonic acid, ethyl arsonic acid, propyl arsonic acid, butyl arsonic acid and allyl arsonic acid, methyl arsonic acid being preferred. The thioarsonic acids from which the amine salts of the invention are prepared will comprise the thio analogs of the above-listed arsonic acids such as trithio methyl arsonic acid.

The novel compounds represented by the formula given above may be prepared from a primary, secondary or tertiary amine; or the stated salt may be derived from a quaternary ammonium compound. The quarternary ammonium compounds are less preferred, since this configuration appears to produce a tendency to cause injury to Bermuda grass, a grass unusually resistant to most arsonates. As among the alkyl amines, either a primary, a secondary or a tertiary amine may be used with about equivalent results; thus for example, dibutylamine salts compare favorably with octylamine salts. In general, however, primary alkyl amine salts will be most preferred. To produce the novel substituted ammonium compounds provided by this invention as defined above, the selected amine or quaternary ammonium compound will contain from 6 to 14, preferably 8 to 12 carbon atoms, and will be alkyl-substituted. The alkyl radicals in the compounds used to prepare the present substituted ammonium salts may be straight chain or branched.

The primary amines useful in the preparation of the novel herbicides of this invention are amines of the formula $R_1NH_2$ where $R_1$ is an alkyl radical, straight-chain or branched, containing 6 to 14 carbon atoms. Illustrative of such amines are hexyl amine, heptyl amine, octyl amine, nonyl amine, decyl amine, undecyl amine, dodecyl amine, tridecyl amine, tetradecyl amine, and so forth. In each case, the various isomers of each amine are intended to be indicated by the generic names shown above; thus for example, isomers of octyl amine which may be employed include n-octyl amine, isooctyl amine, 2-ethylhexyl amine, tert-octyl amine, 2,4-dimethylhexyl amine, and so forth.

Secondary amines which may be employed to produce the amine salts of arsonic acids provided by this invention are of the formula

where each of $R_1$ and $R_2$ is an alkyl radical and the sum of the number of carbon atoms in $R_1$ and $R_2$ is an integer of from 6 to 14. Symmetrical secondary amines of this formula include for example dipropyl amine, diisopropyl amine, dibutyl amine, diisobutyl amine, di-tertbutyl amine, diamyl amine, dihexyl amine, diheptyl amine, and so forth. Asymmetrcal secondary amines may also be employed; illustrative of these are methyl amyl amine, ethyl butyl amine, ethyl amyl amine, ethyl hexyl amine, propyl butyl amine, isopropyl butyl amine, isoamyl butyl amine, butyl hexyl amine, ethyl n-octyl amine, ethyl 2-ethylhexyl amine, propyl 2-ethylhexyl amine, butyl 2-ethylhexyl amine, ethyl isooctyl amine, butyl issooctyl amine, amyl tertoctyl amine, hexyl octyl amine, and the like.

The tertiary amines from which the novel amine salts of this invention may be prepared are alkyl amines containing a total of from 6 to 14, preferably 8 to 12 carbon atoms, and of the formula

where each of $R_1$, $R_2$ and $R_3$ is an alkyl radical. Illustrative of these amines are triethyl amine, diethyl propyl amine, ethyl diisopropyl amine, methyl diisopropyl amine, diethyl butyl amine, diethyl isobutyl amine, tripropyl amine, triisopropyl amine, diisopropyl butyl amine, tributyl amine, tri-tert-butyl amine, dibutyl hexyl amine, and so forth.

When a quaternary ammonium compound is used to prepare the amine salts of the above formula, it will be of the formula

where X is an anion, such as —OH, —Br or —Cl, each of $R_1$, $R_2$, $R_3$ and $R_4$ is an alkyl radical, straight-chain or branched, and the sum of the number of carbon atoms in $R_1$, $R_2$, $R_3$ and $R_4$ is from 6 to 14. Exemplary of such quaternary ammonium compounds, for example, are trimethyl propyl ammonium hydroxide, trimethyl butyl ammonium chloride, trimethyl hexyl ammonium bromide, trimethyl octyl ammonium chloride, trimethyl isooctyl ammonium chloride, trimethyl nonyl ammonium hydroxide, triethyl ethyl ammonium bromide, triethyl butyl ammonium hydroxide, triethyl amyl ammonium chloride, triethyl hexyl ammonium chloride, triethyl octyl ammonium hydroxide, diethyl methyl amyl ammonium chloride, dimethyl ethyl hexyl ammonium chloride, dibutyl diethyl ammonium chloride, and so forth.

It is to be understood that mixtures and combinations of the foregoing amines may be used to produce the alkylammonium salts of this invention.

A preferred class of the presently provided amine salts comprises alkylammonium compounds of the formula

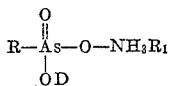

where R is an aliphatic radical selected from the class consisting of methyl, ethyl, propyl, butyl and allyl, $R_1$ is an alkyl radical of from 6 to 14 carbon atoms, and D is a cation selected from the class consisting of H, a water solubilizing alkaline cation and —$NH_3R_1$ where $R_1$ is as defined hereinabove. Preferably D will be H. Where D is H, the salts conforming to the formula illustrated above will most precisely be designated as mono(alkylammonium) aliphatic arsonates, or as alkylammonium hydrogen aliphatic arsonates. However, for brevity, these salts will be referred to herein simply as alkylammonium aliphatic arsonates, whereby the half-acid salt is to be understood to be meant except where the naming of an additional cation or designation of the compound as a bis(alkylammonium)-salt indicates otherwise.

Illustrative of amine salts conforming to the formula given immediately herein above are for example salts such as n-hexylammonium methyl arsonate, isohexylammonium methyl arsonate, n-octylammonium methyl arsonate, isooctylammonium methyl arsonate, tert-octylammonium methyl arsonate, 2-ethylhexylammonium methyl arsonate, decylammonium methyl arsonate, dodecylammonium methyl arsonate, tetradecylammonium methyl arsonate, octylammonium ethyl arsonate, octylammonium propyl arsonate, octylammonium butyl arsonate, octylammonium allyl arsonate, dodecylammonium allyl arsonate, dodecylammonium isopropyl arsonate, octylammonium sodium methyl arsonate, octylammonium potassium ethyl arsonate, decylammonium sodium butyl arsonate, undecylammonium sodium methyl arsonate, dodecylammonium ammonium methyl arsonate, bis(octylammonium) methyl arsonate, bis(tert-octylammonium) methyl arsonate, bis-(dodecylammonium) butyl arsonate, bis(tetradecylammonium) allyl arsonate, and so forth.

When the novel and highly efficacious alkylammonium salts of this invention are prepared by reaction of secondary or tertiary amines or quaternary ammonium hydroxides with arsonic acids, illustrative of the ammonium salts produced are dipropylammonium methyl arsonate, dibutylammonium methyl arsonate, diamylammonium ethyl arsonate, dibutylammonium sodium allyl arsonate, triethylammonium methyl arsonate, triisopropylammonium butyl arsonate, tri-n-propylammonium potassium propyl arsonate, ethyldipropylammonium methyl arsonate, dimethyloctylammonium methyl arsonate, diethyloctylammonium methyl arsonate, diethyl dipropylammonium methyl arsonate, bis(diisopropylammonium) methyl arsonate, bis(dibutylammonium) butyl arsonate, bis(diamylammonium)allyl arsonate, and so forth.

Illustrative of the alkylammonium thioarsonate salts of this invention are the thio analogs of the above-mentioned compounds such as octylammonium trithio methyl arsonate, tetradecylammonium sodium trithiobutyl arsonate, bis(dibutylammonium)trithio methyl arsonate, and so forth.

The alkylammonium salts of the various arsonic acids contemplated herein are prepared simply by reacting the appropriate arsonic acid compound with the desired nitrogen compound, ordinarily in a solvent such as water, benzene, or alcohol. As will be appreciated by those skilled in the art, when compounds other than the free arsonic acids and free amines are selected for the preparation of these salts, the reaction conditions will be suitably adjusted to accomplish the salt formation. Thus for example, metallic salts of the arsonic acids may be treated with an acid such as a mineral acid like HCl to form by metathesis the free arsonic acid and a salt which is the product of combination of the anion of the mineral acid and the metallic cation of the arsonate salt. By removal of the latter salt and reaction of the arsonic acid with the desired alkylamine, the alkylammonium arsonate is produced. The same result may be produced by reacting an acid addition salt of the chosen alkylamine such as an amine hydrochloride or acetate with a metallic arsonate salt, and removing the metallic salt formed by this reaction to leave the alkylammonium salt of the arsonic acid. Other procedures which may be selected to accomplish the alkylammonium salt formation, employing for example an arsonic acid anhydride, will be readily apparent.

The proportions of arsonic acid compound and nitrogen compound to be reacted will depend on whether the mono- or diammonium salt is desired: equimolar amounts of the amine and the arsonic acid form the mono(alkylammonium) salt, and with an excess of amine, formation of the bis(alkylammonium) salt can be promoted. When a mono(alkylammonium) salt is desired in which another water-solubilizing alkaline cation is also present, such as octylammonium sodium methyl arsonate, it can conveniently be prepared by reacting a half-acid salt of the arsonic acid, such as sodium hydrogen methyl arsonate, to the nitrogen compound, or by adding a hydroxide of the alkaline water-solubilizing cation to the solution in which the amine salt is prepared, in amount equivalent to the available acid groups in the arsonic acid compound.

The alkylammonium arsonate will conveniently be prepared in aqueous solution. There may thus be prepared solutions of a strength, with respect to the proportion of active herbicidal salt per volume of solution, such that they are adapted for marketing as herbicidal concentrates. When herbicidal aqueous concentrates are produced in this manner, a volume of water calculated to provide a 20–30%, by weight, solution of the ultimate salt will advantageously be used. The resulting concentrate will then be diluted as required for application to foliage.

On the other hand, when desired, the alkylammonium salts can readily be separated from solution and isolated. When aqueous solutions are selected for their preparation, the isolation of the salts can conveniently be accomplished by salting out the alkylammonium compounds. If the amine compound and the arsonic acid are contacted in an organic medium, hot solutions may be chosen, so that on cooling, the amine arsonate will precipitate out.

In general, the presently provided amine arsonates can be isolated as solids, ranging in nature from crystalline materials in the form of needles, pearly flakes, etc., up to waxy substances and greases. All are very soluble in water and in alcohol.

I also contemplate compositions comprising mixtures of the alkylammonium-forming compounds, such as the alkylamines, with the aforesaid arsonic acids, such compositions being adapted on addition of water to form the alkylammonium salts of this invention. Thus for example, such a composition may be prepared by mixing octylamine with methyl arsonic acid in equimolar proportions.

The preparation of the present compounds is illustrated by the following example.

*Example 1*

To prepare 2-ethylhexylammonium methyl arsonate, 129 parts (1 mole) of 2-ethylhexyl amine are added to 140 parts (1 mole) of methyl arsonic acid dissolved in 1000 parts of hot isopropanol. The resulting solution is allowed to cool to room temperature and then the solvent is evaporated off under vacuum at 70–80° C. This forms a syrup which on standing solidifies to a crystalline mass. The product is recrystallized from benzene giving a substantially quantitative yield of 2-ethylhexylammonium methyl arsonate, M. 89–93° C.

Similarly, using an organic solvent such as isopropanol, ethanol or benzene, there may be prepared:

2-ethylhexylammonium butyl arsonate, M. 60–63° C.
Dodecylammonium methyl arsonate, M. 124–130° C.
Dodecylammonium butyl arsonate, M. 105–110° C.

Similar procedures may be followed to prepare other substituted ammonium organic arsonate salts, in organic or aqueous solution. Thus for example there may be prepared n-octylammonium benzyl arsonate, M. 156–160° C., octadecylammonium methyl arsonate, M. 120–126° C., and anilinium methyl arsonate, M. 88–89.5° C. etc.

Mixed amine salts are prepared similarly by simply contacting the alkyl arsonic acid with the desired amines in solution, in appropriate proportions. When an aqueous solution is selected, the resulting alkyl ammonium alkyl arsonate solution may be advantageously employed directly, optionally after dilution, for the eradication of weeds in accordance with the method of this invention. Thus far example to prepare a mixed alkylammonium salt, 9.4 parts of methylarsonic acid were dissolved in 200 parts of water. To this solution was added 4.3 parts of tert-octyl amine and 6.3 parts by weight of Primene 81R (essentially dodecyl amine: a mixture of amines ranging from $C_{11}$ to $C_{14}$ and having a molecular weight indicating an average $C_{12}$ chain length; sold by Rohm and Haas, Philadelphia, Pennsylvania). This is equivalent to one-half mole each of the tertiary octyl amine and of the mixed, essentially dodecyl amine, per mole of methyl arsonic acid. There is produced an opalescent solution of the mixed alkylammonium salts.

When the alkylammonium arsonates prepared as described above and of the presently provided class of outstandingly effective rapid selective activity are applied to a turf culture, undesirable annual grasses are killed quickly and thoroughly without injury to the desirable perennial turf grass.

The undesirable annual grasses prevalent in turf grass include the following: crabgrass (*Digitaria sanguinalis*) and its varieties (*D. longiflora, D. serotina*), foxtail (*Setaria virdis, lutes cans,* Verticillata, and *faberic*), barnyard grass (*Echinochloa crusgalli*), lemon grass, Dallas grass (*Paspalum dilatalum*) nutgrass (*Cyperus rotundus*), sedge or cocoa grass, goosegrass (*Elusine indica*), sandbur (*Cenchrus pauciflorus*) witchgrass (*Panicum capillare*), yellow nutgrass (*Cyperus esculentus*), knotweed (*Polygonum aviculare*) and common chickweed (*Stellaria media*).

The turf to be treated for eradication of said grassy weeds without injury to the desirable grasses may be composed of Kentucky and Merion blue grass, bents, Zoysia, and Bermuda grasses, as well as dichondra and clover. Fescues are generally more easily damaged by chemicals or other injurious agents, and chemical weed control is less advantageous for these grasses; and St. Augustine grass, too, is susceptible to the chemical.

Application rates of the arsonates for weed control depends on the climate conditions, the type of arsonate, and the carrier. A greater potency and rapidity of herbicidal action will generally be evident under hot, dry conditions and in tropical climates than where lower temperatures prevail, and the effective application rate will accordingly be reduced under the former conditions.

The presently provided amine arsonate salts in which the amine is an alkyl amine containing from 8 to 12 carbon atoms are effective at lower concentrations than those wherein the amine contains 6–7 or 13–14 carbon atoms, and in the preferred amine carbon atom range, primary amine salts are especially potent.

It will be desirable to employ a carrier for the amine arsonate, to ensure even distribution thereof over the area to be treated. The solubility of the present salts in water adapts them for application as aqueous solutions; but organic solvents may be employed if desired. In such application, the amount of solution applied may be varied from about 50 to about 200 gals./acre. With the usual spray applicators, sufficient water or other solvent will advantageously be provided to supply approximately 5 gallons per 1000 square feet as a carrying agent for the chemical. The optimal dilution in part depends on the spray equipment. However, the amount of solvent used will also affect the efficacy of the treatment. Too little water does not allow fullest leaf wetting or distribution on the plants. If too much water is used, the herbicidal solution will run off the foliage and carry the chemical to the ground, where it is essentially inert, since greatest effect is obtained by foliar absorption. The more efficient and atomizing the spray unit is the less water or other solvent can be used, and with less runoff, a higher percentage of the chemical is available for foliar absorption.

Inert solid carriers may alternatively be employed, whereby the herbicide is applied to the plants as a dust. Illustrative of such solid carriers are, for example, vermiculite, pyrophyllite, diatomaceous earth, volcanic ash, wood flour, and the like.

When solids such as vermiculite are used, it is essential that the chemical be carried on the surface of the carrier; application of the active material to the carrier as a solution, whereby it is soaked into the interior of the carrier, is unfavorable. When the chemical is on the carrier surface, then as the carrier particles strike the weed leaf, the arsonate adhering to the carrier surface is dislodged and brought into effective contact with the weed.

The rate of application of the amine arsonate salts will vary from about 3 to about 10 pounds per acre, depending on the factors described above. Where the presently provided salts are employed for the control of grassy weeds associated with biologically closely related desirable vegetation such as perennial grasses in turf it may be preferred to select the lower range of application rates to avoid injury to the desired plant growth. It may sometimes be advantageous to repeat the treatment, where the rate of application selected is low.

The following examples are illustrative of the operation of these novel materials as selective weed control agents.

*Example II*

In cool, damp weather, plots of mixed turf grasses and crabgrass were sprayed with aqueous solutions of the following materials:

Octylammonium methyl arsonate
Octadecylammonium methyl arsonate
Disodium methyl arsonate hexahydrate
Disodium methyl arsonite The disodium methyl arsonate hexahydrate was applied at a rate of 0.5 grams per 10 square feet, at a dilution of 1 part by weight of the arsonate to 166 parts by weight of water. The other salts were applied at a molar equivalent rate, that is a rate equivalent with respect to arsenic content to that at which the disodium methyl arsonate hexahydrate was applied and at the same dilution. (For example, the octyl ammonium salt, having a molecular weight approximately ⅘ of that of the disodium hexahydrate salt, was applied at a rate of about 0.4 grams/10 square feet, at a dilution of 1 part by weight per 166 parts by weight of water.)

The plots were rated after two and after six days. The arsonite exhibited characteristic effects, producing rapid spotting of the crabgrass, but causing no destruction. The attack of the octylammonium arsonate salt on the crabgrass was visibly apparent at the end of the second day.

Within six days, the more rapid effectiveness of the alkylammonium arsonate salts, as compared to the sodium salt, was manifest. The attack of the octylammonium salt on the crabgrass was markedly more advanced than that of the octadecylammonium arsonate.

*Example III*

In warm, sunny weather at 93° F., plots of mixed turf grasses and crabgrass were sprayed as described in Example 1, with the arsenicals listed below. The application rate here was 0.5 gram of disodium methyl arsonate hexahydrate per 5 square feet, and the other compounds at a molar equivalent rate, all at a dilution of 1 part by weight per 166 parts by weight of water. Two days later, the plots were examined and rated. In order of decreasing effectiveness, the rating sequence was as follows:

(1) Ddoecylammonium methyl arsonate
(2) Tetradecylammonium methyl arsonate
(3) Octylammonium methyl arsonate
(4) Mixed octyl- and octadecylammonium methyl arsonate
(5) Octadecylammonium methyl arsonate
(6) Hexadecylammonium methyl arsonate
(7) Methyl arsonic acid
(8) Disodium methyl arsonate hexahydrate
(9) Disodium methyl arsonite The effectiveness of the octyl-, dodecyl-, and tetradecylammonium methyl arsonates was already strongly evident; and the destruction and death of the crabgrass plants in the plots treated by these alkylamine salts followed shortly. The desirable grasses were not injured.

At the time of the rating, the action of the other compounds listed above was proportionately less advanced.

Disodium methyl arsonite produced its characteristic effect of immediate spotting without further effect.

*Example IV*

In clear, very dry, sunny weather, plots of mixed crabgrass were sprayed in midafternoon, at a rate of 1 lb. disodium methyl arsonate hexahydrate or the molar equivalent in 120 gals. water per area of 3000 sq. ft., with aqueous solutions of disodium methyl arsonate, octylammonium methyl arsonate, and dodecylammonium methyl arsonate. On observation at the end of 7 days, it was found that each of the alkylammonium salts had produced 100% destruction of the crabgrass, whereas only 10% of the crabgrass had been killed by that time in the plot sprayed with disodium methyl arsonate. The desirable grass in the plot treated with octylammonium methyl arsonate was free from damage; some blue grass injury was noted at this rate of application of the dodecylammonium salt.

*Example V*

This example illustrates comparison of the presently claimed amine salts with other amine salts of different configuration.

Plots of sandy soil containing mature crabgrass mixed with desirable turf grasses were sprayed at a rate of the molar equivalent of 1 gram of disodium methyl arsonate hexahydrate per liter per 10 square feet, and observed for weed control effectiveness of the treatment. At the time of spraying, the temperature was 87° F. and the weather hot and dry. The materials tested and the results produced are shown in the following table.

| Salt | First day | Fifth day | Eleventh day |
|---|---|---|---|
| 1. t-Octylammonium methyl arsonate | Extreme drying; 25% kill. Slight contact burns. | Over 80% of crabgrass brown, wilted beyond recovery. | Crabgrass kill complete. |
| 2. Octadecylammonium methyl arsonate | Drying and tip damage | Some brown and rest yellowing; tip damage | Crabgrass withered and dead in area treated. |
| 3. Hexadecyl-trimethyl-ammonium methyl arsonate | Drying and yellowing | Injury less advanced than No. 2 | Crabgrass kill incomplete. |
| 4. t-Butyl-ammonium methyl arsonate | Slight contact burns | Varying effectiveness on crabgrass. Some broad-leaf plants affected. | Crabgrass light yellow; effectiveness not very good. |
| 5. Cyclohexyl-ammonium methyl arsonate | do | Not very effective | Do. |
| 6. Abietyl-ammonium methyl arsonate | No observable effect | Yellowing | Crabgrass yellowed and withered, with about ⅓ destruction. |
| 7. Furfuryl-ammonium methyl arsonate | Tip damage | Yellowing and wilting | Crabgrass yellow to brown; fairly effective. |
| 8. Piper-azinium methyl arsonate | Some tip damage and contact burn | Yellowing extensive, but plants still turgid, not limp | Fairly complete (80–90%) brown-out and kill. |
| 9. Tetra (hydroxy-ethyl)-ethylene-diamine salt of methyl arsonate | Strong drying | Yellow to brown | Fxirly effective. |
| 10. Disodium methyl arsonate | No observable effect | do | Yellow to brown. |
| 11. Methyl arsonic acid | Tip damage and contact burns | do | Do. |

Particularly to be noted in the foregoing table is the rate at which the compounds exert their effect. The injury produced by octylammonium methyl arsonate is well advanced within 1–2 days, and the weeds are dead within the week. The methyl arsonate disodium salt on the other hand, as noted above, requires 3 weeks to a month with additional sprays to produce kill, and the other quaternary alkyl arsonate salts act at varying rates but none are as rapid in effect or as effectually controlling in a single application as the octylammonium salt.

*Example VI*

This example illustrates the freedom from injury to desirable grasses observed when the present amine salts are employed for selective weed control.

Plots of mixed grasses in southern New Jersey were heavily watered before application of the compounds. Solutions containing 20% by weight of disodium methyl arsonate and of a molar equivalent quantity of octylammonium methyl arsonate, respectively, were diluted with water as indicated below and applied to the plots with a knapsack sprayer at varying rates, indicated below. After 5 days, the plots were then observed and rated on a scale of from 0 to 10, 0 indicating no injury, and 10, complete destruction. The results were as follows:

| Methyl arsonate salt | Rate/ 200 ft. (tbsp./ gal.) | Crab-grass | Merion mix | Kentucky | Bent grass |
|---|---|---|---|---|---|
| Octylammonium | 4/2 | 8/7 | 5/3 | 3/2 | 4/3 |
| Disodium | 4/2 | 6/2 | 4/3 | 2/2 | 4/3 |
| Check (no treatment) | | 0 | 3 | 2 | 3 |

| Methyl arsonate salt | Rate/ 200 ft. (tbsp./ gal.) | Fescue | Kentucky Blue | Bermuda | Merion |
|---|---|---|---|---|---|
| Octylammonium | 4/2 | 4/1 | 2/2 | 2/0 | 3/2 |
| Disodium | 4/2 | 2/1 | 2/2 | 1/0 | 3/2 |
| Check (no treatment) | | 1 | 2 | 0 | 2 |

From the foregoing data, it will be evident that the octylammonium salt is twice as potent as the disodium salt; equal or greater injury to crabgrass is produced at a rate of application only one-half as high.

It is to be noted that at the lower level of application, the condition of the desirable grasses in the plot treated with the octylamine salt was the same as that in the check plot, any injury observed being due to drought or cutting. The crabgrass, however, was severely injured.

*Example VII*

This example illustrates the breadth of activity of the presently provided ammonium compounds.

Dodecylammonium methyl arsonate applied as an aqueous solution at a rate equivalent to 10 pounds of disodium methyl arsonate per acre, at a dilution such that the spray rate was equal to 5 gallons per 1000 square feet or about 200 gallons per acre gave complete control of *Elusine indica*. Disodium methyl arsonate under parallel conditions only stunts and yellows this weed.

One application of the dodecylammonium salt also gives control of common chickweed (*Stellaria media*) and *Oxalis stricta*.

While the invention has been described with reference to various particular preferred embodiments thereof, it will be appreciated that variations and modifications can be made within the scope of the appended claims.

What is claimed is:

1. Substituted ammonium salts of arsonic acids of the formula

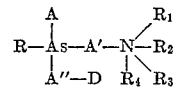

where R is an aliphatic radical selected from the class consisting of methyl, ethyl, propyl, butyl and allyl; A, A' and A" are atoms of an element of group VIA having an atomic weight below 40; D is a cation selected from the class consisting of H, the water-solubilizing alkaline cations $NH_4^+$, $K^+$ and $Na^+$, and

wherein

is an alkylammonium radical containing from 6 to 14 carbon atoms in which $R_1$ is an alkyl radical and each of $R_2$, $R_3$ and $R_4$ is selected from the class consisting of H atoms and alkyl radicals.

2. The compounds of claim 1 where each of A, A' and A" is a sulfur atom.

3. The compounds of claim 1 where each of A, A' and A" is an oxygen atom.

4. A mixture of at least two different alkylammonium compounds, each such compound being a salt as defined in claim 23.

5. Substituted ammonium salts of arsonic acid of the formula $CH_3$—$As(O)(OH)ONH_3R_1$ where $R_1$ is an alkyl radical containing from 8 to 12 carbon atoms.

6. Octylammonium methyl arsonate..

7. Dodecylammonium methyl arsonate.

8. Tetradodecylammonium methyl arsonate.

9. Substituted ammonium salts of arsonic acid of the formula $CH_3$—$As(O)(OD)ONH_3R_1$ where D is a water-solubilizing alkaline cation selected from the class consisting of $NH_4^+$, $K^+$ and $Na^+$ and $R_1$ is an alkyl radical containing from 8 to 12 carbon atoms.

10. Substituted ammonium salts of arsonic acid of the formula $CH_3$—$As(O)(ONH_3R_1)_2$ where $R_1$ is an alkyl radical containing from 8 to 12 carbon atoms.

11. The composition of claim 4, wherein said mixture comprises octylammonium methyl arsonate as one of said alkylammonium compounds.

12. A composition of matter adapted to form octylammonium methyl arsonate on solution thereof in water which consists essentially of a mixture of equimolecular amounts of octylamine and methyl arsonic acid.

13. A composition of matter adapted to form dodecylammonium methyl arsonate on solution thereof in water which consists essentially of a mixture of substantially equimolecular amounts of dodecylamine and methyl arsonic acid.

14. Substituted ammonium salts of arsonic acid of the formula

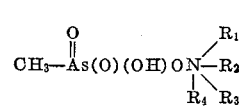

where

is an alkylammonium radical containing a total of from 6 to 14 cargon atoms in which $R_1$ is an alkyl radical and each of $R_2$, $R_3$, and $R_4$ is selected from the group consisting of H and alkyl radicals.

15. A weed control composition comprising an inert carrier and as the essential active ingredient, a compound as defined in claim 1.

16. A weed control composition comprising a solid inert carrier and as the essential active ingredient, a compound as defined in claim 1.

17. A weed control composition comprising a solution of a compound as defined in claim 1 as the essential active ingredient.

18. The method of controlling vegetative growth which comprises applying to vegetation a phytotoxic amount of a compound as defined in claim 1.

19. The method of controlling crabgrass which comprises applying to an area containing crabgrass a phytotoxic amount of at least one compound as defined in claim 1.

20. The method of controlling Dallas grass which comprises applying to an area containing Dallas grass at least one compound as defined in claim 1, in amount phytotoxic to said Dallas grass.

21. The method for the selective control of crabgrass in an area containing crabgrass in conjunction with desirable vegetation which comprises applying to said area a composition comprising an inert carrier and a compound as defined in claim 1, in concentration and amount sufficient to destroy crabgrass but insufficient to destroy material quantities of the useful grasses and plants.

22. The method for the selective control of crabgrass in an area containing crabgrass in turf which comprises applying to said area a composition comprising a mixture of an inert diluent and at ltast one compound of the formula $$R—As(O)(OH)(ONH_3R_1)$$

where R is methyl, and $R_1$ is an alkyl radical containing from 8 to 12 carbon atoms, in a concentration and amount sufficient to destroy crabgrass but insufficient to destroy material quantities of the useful grasses and plants of said turf.

23. The method for the selective control of Dallas grass in an area containing Dallas grass in turf which compries applying to said area a composition comprising a mixture of an inert diluent and at least one compound of the formula $$R—As(O)(OH)(ONH_3R_1)$$
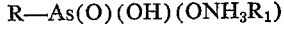

where R is methyl, and $R_1$ is an alkyl radical containing from 8 to 12 carbon atoms, in a concentration and amount sufficient to destroy Dallas grass but insufficient to destroy material quantities of the useful grasses and plants of said turf.

24. The method for the selective control of annual grasses in turf which comprises applying to turf containing annual grasses a composition comprising at least one compound as defined in claim 1 in a concentration and amount sufficient to destroy said annual grasses but insufficient to destroy material quantities of the useful grasses and plants of said turf.

25. The method for selective control of weeds in turf which comprises applying to turf containing weeds a composition comprising at least one compound as defined in claim 1 in a concentration and amount sufficient to destroy said weeds but insufficient to destroy material quantities of the useful grasses and plants of said turf.

26. A weed control composition comprising an inert carrier, and as the essential active ingredient, an effective amount of an alkylammonium methyl arsonate comprising octylammonium methyl arsonate.

27. A weed control composition comprising an inert carrier, and as the essential active ingredient, an effective amount of an alkylammonium methyl arsonate comprising dodecylammonium methyl arsonate.

28. The method of controlling vegetative growth which comprises applying to vegetation a phytotoxic amount of an alkylammonium methyl arsonate comprising octylammonium methyl arsonate.

29. The method of controlling vegetative growth which comprises applying to vegetation a phytotoxic amount of an alkylammonium methyl arsonate comprising dodecylammonium methyl arsonate.

30. The method for the selective control of crabgrass in an area containing crabgrass in conjunction with desirable vegetation which comprises applying to said area a composition comprising an inert carrier and an alkylammonium methyl arsonate comprising octylammonium methyl arsonate, in concentration and amount sufficient to destroy crabgrass but insufficient to destroy material quantities of the useful grasses and plants.

31. The method for the selective control of crabgrass in an area containing crabgrass in conjunction with desirable vegetation which comprises applying to said area a composition comprising an inert carrier and an alkylammonium methyl arsonate comprising dodecylammonium methyl arsonate, in concentration and amount sufficient to destroy crabgrass but insufficient to destroy material quantities of the useful grasses and plants.

32. A composition of matter adapted to form an alkyl arsonic acid alkylammonium salt on solution thereof in water which consists essentially of a mixture of an aliphatic arsonic acid of the formula

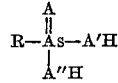

where R is selected from the group consisting of methyl, ethyl, propyl, butyl and allyl, and A, A' and A" are atoms of group VIA having an atomic weight below 40, with an alkyl nitrogen compound containing from 6 to 14 carbon atoms selected from the class consisting of alkylamines and alkyl quaternary ammonium compounds.

References Cited in the file of this patent
UNITED STATES PATENTS 2,476,890    Morehouse  _____ July 19, 1949
2,678,265    Schwerdle  _____ May 11, 1954

OTHER REFERENCES

Zimmerman in "Indus. and Engr. Chem.," May 1943, page 596.

Crocker: "Growth of Plants," 1948, page 226.

Northeastern Weed Control Conference, Proceedings of Ninth Annual Meeting, January 1955, page 7.